US009987872B2

(12) United States Patent
Mehta et al.

(10) Patent No.: US 9,987,872 B2
(45) Date of Patent: Jun. 5, 2018

(54) SECURITY DOCUMENT

(75) Inventors: Rajendra Mehta, Dayton, OH (US); John Harden, Concord, NC (US); David Lienesch, Centerville, OH (US); Brian Berg, Dayton, OH (US)

(73) Assignee: Taylor Communications, Inc., North Mankato, MN (US)

( * ) Notice: Subject to any disclaimer, the term of this patent is extended or adjusted under 35 U.S.C. 154(b) by 121 days.

(21) Appl. No.: 13/606,183

(22) Filed: Sep. 7, 2012

(65) Prior Publication Data

US 2014/0070525 A1 Mar. 13, 2014

(51) Int. Cl.

| | |
|---|---|
| ***B42D 15/00*** | (2006.01) |
| ***B42D 15/10*** | (2006.01) |
| ***G09C 3/00*** | (2006.01) |
| ***B42D 25/29*** | (2014.01) |

(52) U.S. Cl.
CPC .................................... *B42D 25/29* (2014.10)

(58) Field of Classification Search
CPC ........ B42D 15/00; B42D 15/10; B42D 25/29; G09C 3/00
USPC ........ 283/57, 58, 59, 67, 70, 72, 74, 81, 94, 283/96, 98, 101, 108, 111, 901
See application file for complete search history.

(56) References Cited

U.S. PATENT DOCUMENTS

| | | | | |
|---|---|---|---|---|
| 3,802,724 | A * | 4/1974 | Gosnell | 283/109 |
| 4,407,443 | A | 10/1983 | McCorkle | |
| 4,488,646 | A | 12/1984 | McCorkle | |
| 4,726,608 | A * | 2/1988 | Walton | 283/96 |
| 4,837,061 | A | 6/1989 | Smits et al. | |
| 5,209,515 | A | 5/1993 | Dotson et al. | |
| 5,547,916 | A | 8/1996 | Morrison | |
| 5,618,063 | A | 4/1997 | Chang et al. | |
| 5,644,352 | A | 7/1997 | Chang et al. | |
| 5,720,801 | A | 2/1998 | Nadan et al. | |
| 5,873,604 | A | 2/1999 | Phillips | |
| 6,394,358 | B1 | 5/2002 | Thaxton et al. | |
| 6,616,190 | B1 | 9/2003 | Jotcham | |
| D619,359 | S | 7/2010 | Pascua et al. | |
| 7,892,639 | B2 | 2/2011 | Mess et al. | |
| 8,622,436 | B2 | 1/2014 | Mehta et al. | |
| 2003/0124436 | A1* | 7/2003 | Shioda et al. | 283/86 |
| 2005/0258634 | A1 | 11/2005 | Dronzek, Jr. | |
| 2007/0029785 | A1 | 2/2007 | Fedrigoni | |
| 2007/0210572 | A1* | 9/2007 | Halbrook et al. | 283/62 |

(Continued)

*Primary Examiner* — Justin V Lewis
(74) *Attorney, Agent, or Firm* — Patterson Thuente Pedersen, P.A.

(57) ABSTRACT

A security document includes a substrate, and an imaging thermal coating on at least a portion of the surface of the substrate for thermal printing on the security document. The imaging thermal coating is soluble in one or more solvents. A warning message is printed on the substrate in an ink which is substantially insoluble in the one or more solvents. An obscuring coating on the substrate covers the warning message such that the warning message is not apparent to an observer. The obscuring coating is soluble in the one or more solvents, such that the obscuring coating is removed from the substrate if the document is subjected to washing with the one or more solvents to remove printed images on the imaging thermal coating. By this arrangement, an attempt to alter the security document by washing the security document with the one or more solvents is made apparent.

32 Claims, 4 Drawing Sheets

(56) References Cited

U.S. PATENT DOCUMENTS

| | | | | |
|---|---|---|---|---|
| 2009/0286032 | A1* | 11/2009 | Franklin | G09F 3/0291 428/41.8 |
| 2012/0104743 | A1 | 5/2012 | Mehta et al. | |
| 2012/0274059 | A1* | 11/2012 | Moronuki et al. | 283/61 |

* cited by examiner

SECURITY DOCUMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This relates to security documents, and more particularly to an arrangement for making more difficult the nefarious alteration of security documents printed with a thermal printer. Thermal printers are useful for a wide variety of applications, including printing receipts and credit slips that may later be exchanged for cash. For example, an automated coin counting machine, typically located in a supermarket, issues a thermally printed receipt when a quantity of coins is poured into the machine and counted. The receipt is then taken to a cashier where the bearer will receive the printed amount in paper currency. Clearly, fraudulent alteration of the receipt could result in a significant loss for the supermarket.

A common approach to altering documents printed with a thermal printer is to wash the documents in a solvent that dissolves the heat activated coating with the thermally printed indicia, leaving a clean form document. After the washing process, the documents may be dried and then printed with altered information. Because of the wide use of thermal printers, it is desired to provide thermally printed documents that are not easily altered.

SUMMARY

A security document may include a substrate and an imaging thermal coating on at least a portion of the surface of the substrate for thermal printing on the security document. A warning message is printed on the substrate in a substantially insoluble ink, and an obscuring coating on the substrate covers the warning message such that the warning message is not apparent. The obscuring coating is readily removable from the substrate when the document is subjected to washing with a solvent to remove thermal printed images. As a result, an attempt to alter the security document is made apparent.

The substrate may be a paper material, or a film material. The obscuring coating may be an activated thermal coating. The obscuring coating may comprise a thermal coating which has not been activated, whereby the presence of the obscuring coating on the substrate may be tested by the application of heat, as by scratching or rubbing the obscuring coating, and by observing a resultant color change in the obscuring coating. The obscuring coating may comprise a thermal coating having a color prior to activation that is substantially the same as the color of the substantially insoluble ink. The warning message printed on the substrate in a substantially insoluble ink may comprise a written warning. The substrate in a substantially insoluble ink may comprise a graphic warning. The obscuring coating may comprise a thermal coating which has been activated.

A security document may include a substrate, and an imaging thermal coating on at least a portion of the surface of the substrate for thermal printing on the security document. The imaging thermal coating is soluble in one or more solvents. A warning message is printed on the substrate in an ink which is substantially insoluble in the one or more solvents. An obscuring coating is provided on the substrate covering the warning message such that the warning message is not apparent to an observer. The obscuring coating is soluble in the one or more solvents, such that the obscuring coating is removed from the substrate if the document is subjected to washing with the one or more solvents to remove printed images on the imaging thermal coating. As a result, an attempt to alter the security document by washing the security document with the one or more solvents is made apparent.

The substrate may comprise a paper material, or a film material. The obscuring coating may comprise an activated thermal coating. The obscuring coating may comprise a thermal coating which has not been activated, whereby the presence of the obscuring coating on the substrate may be tested by the application of heat, as by manually scratching or rubbing the obscuring coating, and by observing a resultant color change in the obscuring coating. The obscuring coating may comprise a thermal coating having a color prior to activation that is substantially the same as the color of the substantially insoluble ink. The warning message printed on the substrate in a substantially insoluble ink may comprise a written warning, or a graphic warning. The obscuring coating may comprise a thermal coating which has been activated.

DETAILED DESCRIPTION

This relates to thermal printed security documents and, more specifically, to thermal printed documents which are difficult to alter. Thermal printed documents typically have a coating on the document substrate. The coating responds to heat from the print head of a thermal printer to change color and provide printed indicia and graphics. Thermal coatings commonly have three components, a color former, which is typically a colorless dye, a color developer, and a sensitizer. These may be solid materials that are ground to fine particles and into a coating formulation along with any optional additives such as pigments, binders and lubricants.

This coating formulation is then applied to the surface of the document substrate, which may commonly be a paper or film material, and dried. The indicia and graphic images are then formed when portions of the coating change color when heat causes the components to melt and interact. In some coating formulations, the components may be encapsulated in microcapsules which rupture or are permeable when exposed to heat from the printer.

In the past, someone wishing to alter a thermal printed security document would wash the document in an appropriate solvent to remove the coating, including the portions of the coating which were changed in color by the thermal printer. The resulting blank document would then be reprinted, using some other printing technique, producing an altered security document that appeared genuine.

Figure 6A:
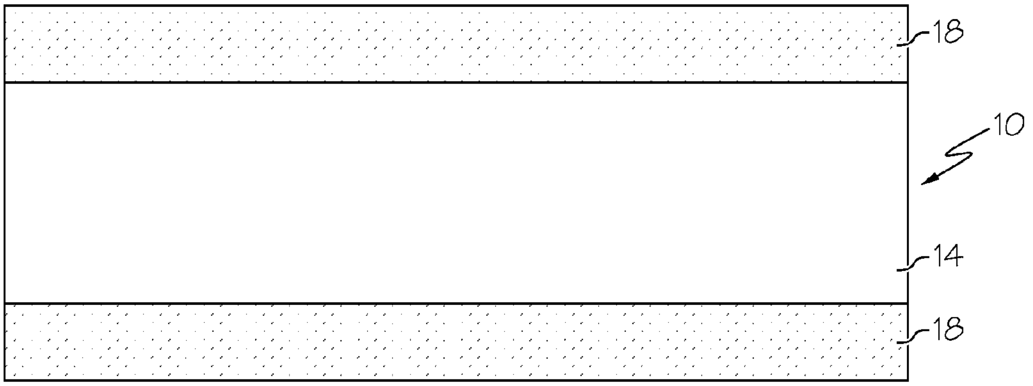
FIG. 6A is a plan view of a first embodiment of a security document that provides protection against alteration.
Figure 6B:
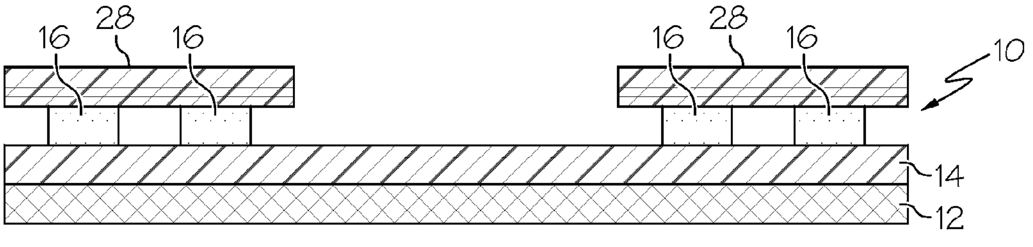
FIG. 6B is an enlarged, diagrammatic side view of the security document of FIG. 6A, showing the document substrate, ink and coatings.

The security document 10 shown in FIGS. 6A and 6B makes this alteration technique much more difficult. The document has a substrate 12, which may be any material suitable for the purpose, but typically a paper or film material. An imaging thermal coating 14 is provided on at least a portion of the surface of said substrate. Areas of the imaging thermal coating 14 are activated by the thermal printer to produce the variable data that is to be printed on the security document. A warning message 16 is printed on the substrate 12 in a substantially insoluble ink, that is, in an ink which is not soluble in most solvents and particularly those solvents in which the thermal coating 14 is soluble. The warning message is normally shielded from view by an obscuring coating 18 on the substrate 12, covering the warning message 18 such that the warning message is not apparent to an observer. The obscuring coating 18 is selected to be readily removable from the substrate 12 when the document 10 is subjected to washing with a solvent to remove thermal printed images. In other words, the obscuring coating 18 is selected such that it is soluble in the same solvents as the imaging thermal coating 14 so that washing away the printed image on the coating 14 also washes away the obscuring coating 18. As a consequence, an attempt to alter the security document is made apparent to an observer by revealing the warning message which remains in view on the document.

The warning message 16 is shown as being printed on top of the thermal coating 14, and this is satisfactory, provided that the ink in which the warning message 16 is printed permeates the coating 14 and the top of the substrate 12. It will be appreciated that if the ink of the printed warning message 16 were to be separated physically from the substrate 12, washing away the coating 14 might result in removing the warning message from the document as well, even though the ink in which the warning message is printed is not soluble in the solvent. As an alternative, the warning message 16 may be printed on the surface of the substrate 12 before the thermal coating 14 is applied to the substrate 12. This will insure that the ink of the warning message 16 sufficiently permeates and stains the substrate 12 that the removal of the thermal coating 14 does not also remove the warning message.

The obscuring coating 18 may be an activated thermal coating, and may simply be an additional layer of the same coating material as is used for coating 14. This will insure, of course, that any solvent used to was the document that removes the imaging thermal coating 14 will also remove the obscuring coating 18. The coating 18 may be activated before it is coated onto the document 10. It will be appreciated, however, that the obscuring coating 18 may differ from the coating used for coating 14 as long as the coatings 14 and 18 are soluble in the same solvents. For example, a different thermal coating which is opaque prior to activation may be used in its inactive form to coating an obscure the warning message. Such an opaque coating may be warmed by rubbing or scratching, changing the color of the coating and providing a means of testing for the presence of the obscuring coating 18 and increasing the confidence of the holder that the security document has not been altered by washing. To obscure the warning message 16 effectively, the obscuring coating 18 may comprise a thermal coating having a color prior to activation that is substantially the same as the color of the substantially insoluble ink making up the warning message 16. The warning message 16 printed on the substrate 12 in a substantially insoluble ink may comprise a written warning, a graphic warning, or both.

Figure 7A:
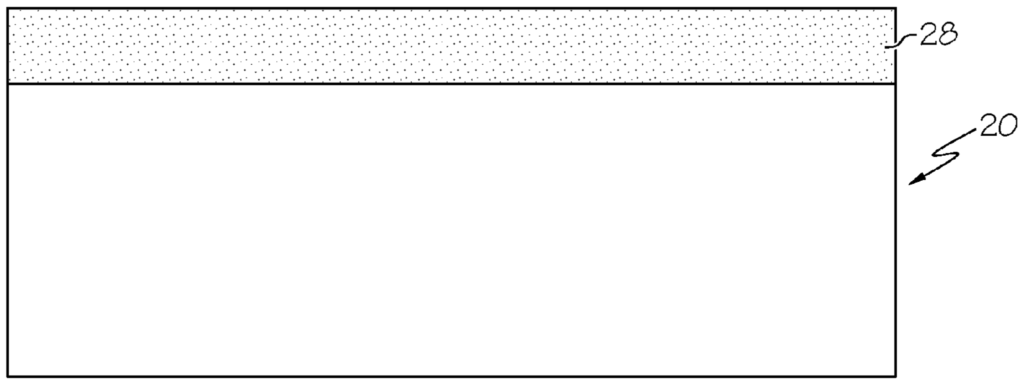
FIG. 7A is a plan view of a second embodiment of a security document that provides protection against alteration.
Figure 7B:
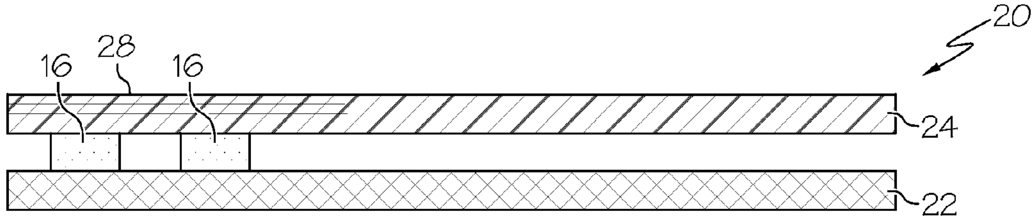
FIG. 7B is an enlarged, diagrammatic side view of the security document of FIG. 7A, showing the document substrate, ink and the thermal coating.

Reference is now made to the embodiment of the security document 20 shown in FIGS. 7A and 7B. Like the security document 10 of FIGS. 6A and 6B, the security document 20 includes a substrate 22 that may be a paper material, a film material, or any other suitable sheet-like material. The document 20 includes an imaging thermal coating 24 on at least a portion of the surface of the substrate for thermal printing on the security document 20. The imaging thermal coating 24 will be soluble in one or more solvents. A warning message 26 is printed on the substrate 22 in an ink which is substantially insoluble in the one or more solvents. The document 20 includes an obscuring coating 28 on the substrate 12 covering the warning message 26 such that the warning message 26 is not apparent to an observer. The obscuring coating is soluble in the one or more solvents, such that the obscuring coating 28 is removed from the substrate 22 if the document is subjected to washing with the one or more solvents to remove printed images on the imaging thermal coating. It will be seen that an attempt to alter the security document 20 by washing the security document 20 with the one or more solvents will become apparent since the warning message 26 will be clearly visible to an observer. In the document 20 of FIGS. 7A and 7B, the obscuring coating 28 is actually an activated portion of the imaging thermal coating 24. The substrate 22, having the warning message 26 printed along one side portion, will be coated with the thermal imaging coating 24 which will not be activated. After the coating 24 dries, the portion of the document bearing the warning message 26 will be warmed with a heated roller, with the result that the coating 24 will be activated and the warning message obscured.

It will be appreciated that although the coatings, substrate, and ink in FIGS. 6B and 7B are shown as relatively thick and as spaced apart vertical (as for example the vertical spacing between coating 24 and substrate 22), this is simply a diagrammatic representation. The actual coatings are much thinner and are in direct contact with adjacent layers of the security document.

Figure 1:
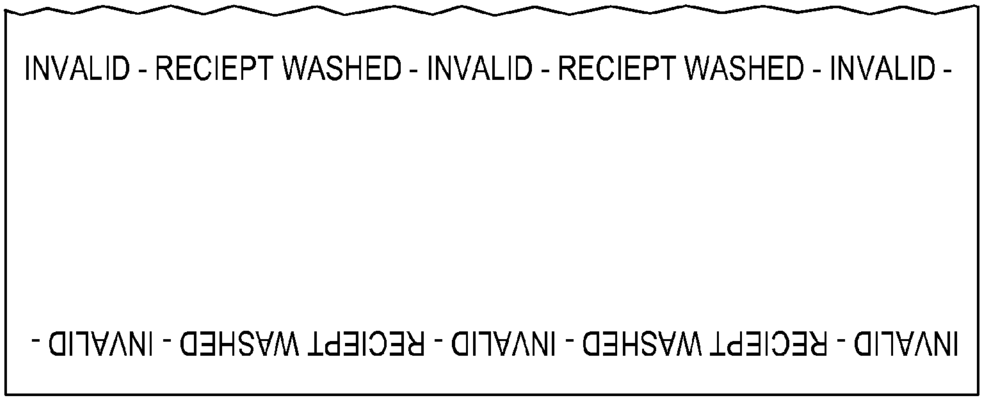
FIG. 1 is a plan view of a paper substrate printed with a warning message in a substantially insoluble ink.
Figure 2:
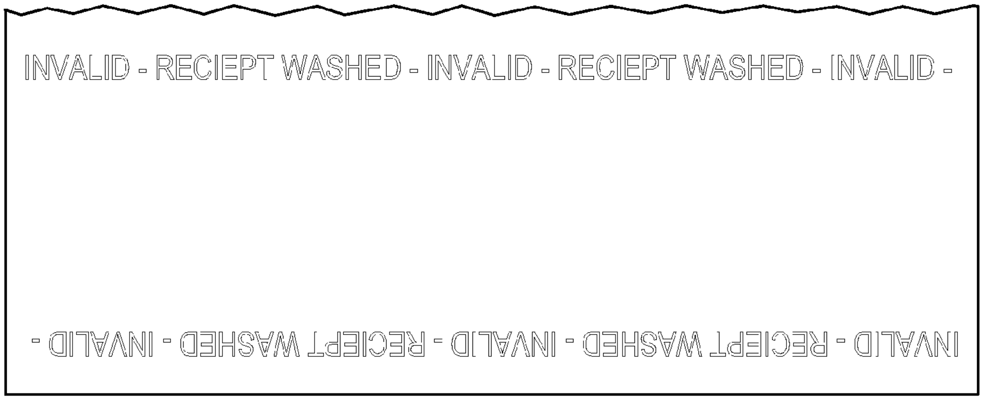
FIG. 2 is a plan view of the paper substrate of FIG. 1 after coating with an inactive thermal coating.
Figure 3:
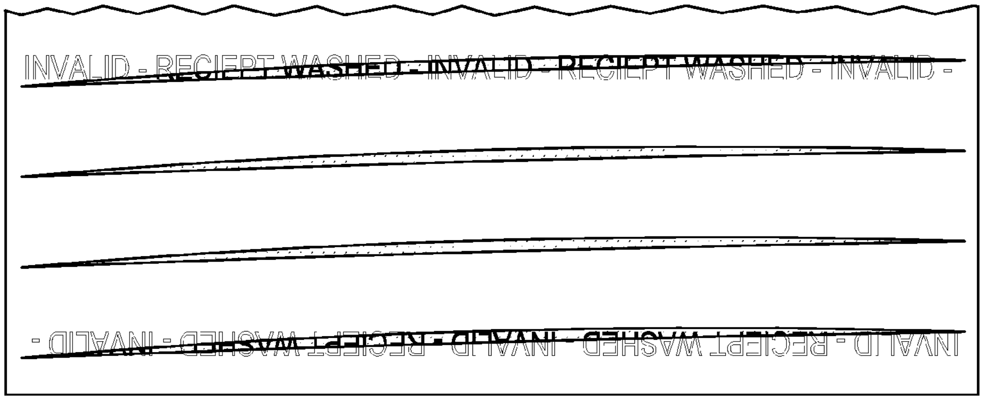
FIG. 3 is a plan view of the paper substrate of FIGS. 1 and 2, after scratching to confirm the presence of an inactive thermal coating.
Figure 4:
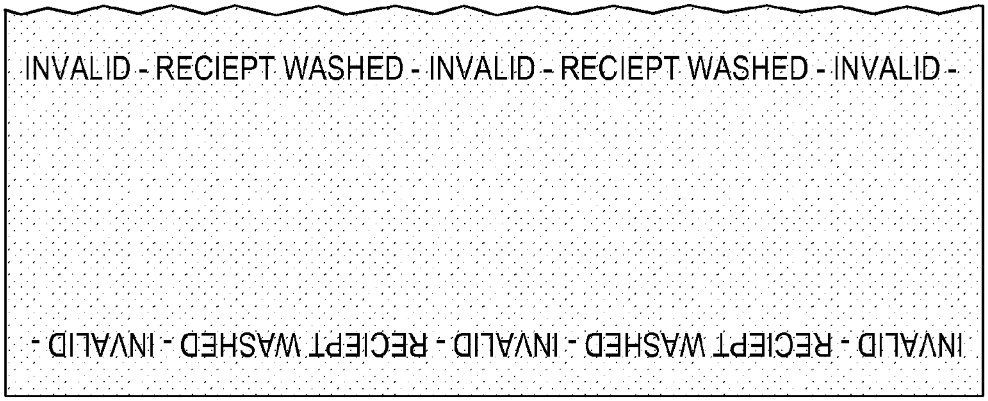
FIG. 4 is a plan view of a paper substrate coated with an activated thermal coating.
Figure 5:
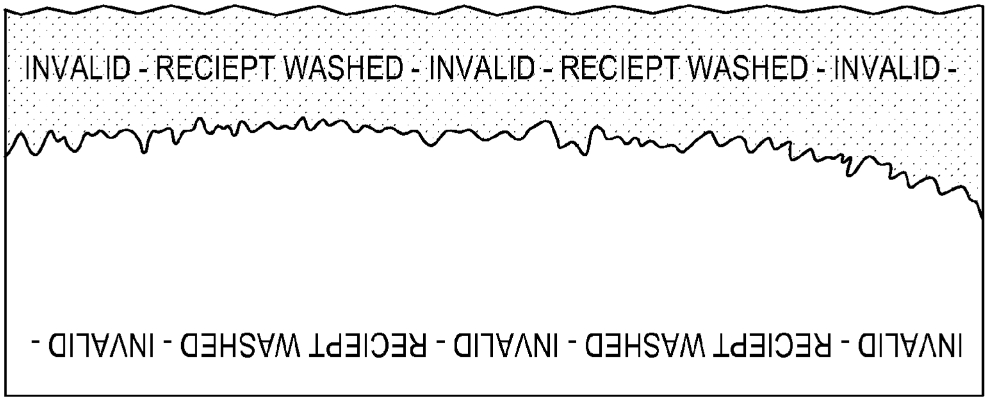
FIG. 5 is a plan view of the paper substrate of FIG. 4, after washing with a solvent.

FIGS. 1-5 show the manner in which the coating and inks making up the documents of FIGS. 6 and 7 function. FIG. 1 depicts a paper substrate which is printed with a repeating pattern of "RECEIPT WASHED INVALID" along top and bottom edges. FIG. 2 shows the paper substrate after it is coated with a thermal coating over its entire upper surface. FIG. 3 illustrates the changes in color that occur when the thermal coating is subjected to warming through scratching. FIG. 4 shows the coated paper after it has been warmed, causing the thermal coating to be activated completely. Finally, FIG. 5 depicts the coated paper after a part of it along the lower edge has been washed with a solvent to remove the thermal imaging coating and exposing the warning message to view.

The obscuring coating may be any of a number of coating materials that obscure the warning message from view, that are washed away by a solvent when the document image is removed by the solvent, and that offer additional security features not provided by conventional inks that a forger might use to obscure the warning message after washing. The termochromic ink coating shown in FIG. 3 is an example of such a coating. Other coatings may include scratch off inks that can be scratched from the document, coin the scratch inks that change color in response to being rubbed with a coin, photochromic inks, optically variable inks that change appearance depending upon the angle of view, and fluorescent inks that fluoresce when subjected to light at a specific frequency.

It should be appreciated that the document image that is protected, although described above in respect to a thermally printed image, may also be an image printed with ink in a different manner, such as for example an image printed with an ink jet printer. In any event, however, the protected image is defined by an imaging coating, such as an ink jet ink, which is soluble in essentially the same solvents as the obscuring coating on the substrate, covering the warning message. As a consequence, an attempt to wash away the protected image will also wash away the obscuring coating, alerting an observer to the alteration of the document image.

What is claimed is:

1. A security document, comprising:

a substrate, an imaging thermal coating on at least a portion of the surface of said substrate for thermal printing on said security document, the imaging thermal coating being soluble in a solvent, a warning message printed on said substrate and/or said imaging thermal coating in a substantially insoluble ink, and an adhesive-free obscuring coating coated directly over the warning message to cover and obscure said warning message such that said warning message is not apparent, said obscuring coating being soluble in the solvent, wherein the obscuring coating and the imaging thermal coating are readily removable from said substrate and the warning message is not removable from the said substrate when said document is subjected to washing with the solvent such that the warning message remains on the substrate and an attempt to alter said security document by washing with the solvent is made apparent.

2. The security document of claim 1, in which said substrate is a paper material.

3. The security document of claim 1, in which said substrate is a film material.

4. The security document of claim 1, in which said obscuring coating is an activated thermal coating.

5. The security document of claim 1, in which said obscuring coating comprises a thermal coating which has not been activated, whereby a presence of said obscuring coating on said substrate may be tested by the application of heat, as by scratching or rubbing said obscuring coating, and by observing a resultant color change in said obscuring coating.

6. The security document of claim 1, in which said obscuring coating comprises a thermal coating having a color prior to activation that is substantially the same as the color of said substantially insoluble ink.

7. The security document of claim 1, in which said warning message comprises a written warning.

8. The security document of claim 1, in which said warning message comprises a graphic warning.

9. A security document, comprising:

a substrate, an imaging thermal coating on at least a portion of the surface of said substrate for thermal printing on said security document, said imaging thermal coating being soluble in one or more solvents, a warning message printed on said substrate and/or said imaging thermal coating in an ink which is substantially insoluble in said one or more solvents, and an adhesive-free obscuring coating coated on said substrate, and covering and obscuring said warning message such that said warning message is not apparent to an observer, said obscuring coating and imaging thermal coating being soluble in said one or more solvents, such that said obscuring coating and imaging thermal coating are removed from said substrate if said document is subjected to washing with said one or more solvents to remove printed images on said imaging thermal coating thereby revealing the warning message and an attempt to alter said security document by washing said security document with said one or more solvents is made apparent.

10. The security document of claim 9, in which said substrate comprises a paper material.

11. The security document of claim 9, in which said substrate comprises a film material.

12. The security document of claim 9, in which said obscuring coating comprises an activated thermal coating.

13. The security document of claim 9, in which said obscuring coating comprises a thermal coating which has not been activated, whereby a presence of said obscuring coating on said substrate may be tested by the application of heat, as by manually scratching or rubbing said obscuring coating, and by observing a resultant color change in said obscuring coating.

14. The security document of claim 9, in which said obscuring coating comprises a thermal coating having a color prior to activation that is substantially the same as the color of said substantially insoluble ink.

15. The security document of claim 9, in which said warning message comprises a written warning.

16. The security document of claim 9, in which said warning message comprises a graphic warning.

17. A security document, comprising:

a substrate, an image defined by an imaging coating on at least a portion of the surface of said substrate for printing on said security document, a warning message printed on said substrate and/or said imaging coating in a substantially insoluble ink, and an adhesive-free obscuring coating coated on said substrate covering said warning message such that said warning message is not apparent, said obscuring coating being readily removable from said substrate when said document is subjected to washing with a solvent to remove said image, wherein said obscuring coating comprises a coating having a color that is substantially the same as the color of said substantially insoluble ink, whereby the warning message remains on the substrate after said washing such that an attempt to alter said security document is made apparent.

18. The security document of claim 17, in which said substrate is a paper material.

19. The security document of claim 17, in which said substrate is a film material.

20. The security document of claim 17, in which said obscuring coating is an activated thermal coating.

21. The security document of claim 17, in which said obscuring coating comprises a thermal coating which has not been activated, whereby the presence of said obscuring coating on said substrate may be tested by an application of heat, as by scratching or rubbing said obscuring coating, and by observing a resultant color change in said obscuring coating.

22. The security document of claim 17, in which said obscuring coating comprises a thermal coating having a color prior to activation that is substantially the same as the color of said substantially insoluble ink.

23. The security document of claim 17, in which said warning message comprises a written warning.

24. The security document of claim 17, in which said warning message comprises a graphic warning.

25. The security document of claim 17, in which said obscuring coating comprises a scratch off ink that may be scratched from the substrate.

26. The security document of claim 17, in which said obscuring coating comprises a coin scratch ink that changes color in response to being rubbed with a coin.

27. The security document of claim 17, in which said obscuring coating comprises a photochromic ink.

28. The security document of claim 17, in which said obscuring coating comprises an optically variable ink.

29. The security document of claim 17, in which said obscuring coating comprises a fluorescent ink that fluoresces when subjected to light.

30. The security document of claim 1, wherein at least a portion of the warning message is printed on the imaging thermal coating, and wherein the insoluble ink of the warning message permeates the imaging thermal coating and a top surface of the substrate.

31. The security document of claim 9, wherein at least a portion of the warning message is printed on the imaging thermal coating, and wherein the insoluble ink of the warning message permeates the imaging thermal coating and a top surface of the substrate.

32. The security document of claim 17, wherein at least a portion of the warning message is printed on the imaging coating, and wherein the insoluble ink of the warning message permeates the imaging coating and a top surface of the substrate.

* * * * *